United States Patent [19]

Angelov et al.

[11] Patent Number: 4,990,023
[45] Date of Patent: Feb. 5, 1991

[54] JOINT FOR ASSEMBLING OF SIEVE ELEMENTS

[75] Inventors: Georgi N. Angelov; Bogdan T. Ivanov; Ivan Y. Binbashiev; Mariela P. Popsavova, all of Sofia, Bulgaria

[73] Assignee: Institut Po Technicheska Kibernet Ika I Robotika, Sofia, United Kingdom

[21] Appl. No.: 8,508

[22] PCT Filed: Mar. 21, 1985

[86] PCT No.: PCT/BG86/00003
§ 371 Date: Jan. 21, 1987
§ 102(e) Date: Jan. 21, 1987

[87] PCT Pub. No.: WO86/05559
PCT Pub. Date: Sep. 25, 1986

[30] Foreign Application Priority Data

Mar. 21, 1985 [BG] Bulgaria ................................. 69366

[51] Int. Cl.$^5$ ............................................. B25G 3/00
[52] U.S. Cl. ..................................... 403/408.1; 411/40
[58] Field of Search ................. 411/40, 41, 42, 60; 403/408.1

[56] References Cited

U.S. PATENT DOCUMENTS

| | | | |
|---|---|---|---|
| 2,402,287 | 6/1946 | Kearns | 411/41 |
| 3,082,657 | 3/1963 | Fischer | 411/42 |
| 4,405,272 | 9/1983 | Wollar | 411/41 |

FOREIGN PATENT DOCUMENTS

| | | | |
|---|---|---|---|
| 1118152 | 6/1968 | United Kingdom | 403/408.1 |
| 2113121 | 8/1983 | United Kingdom . | |

Primary Examiner—Andrew V. Kundrat
Attorney, Agent, or Firm—Klein & Vibber, P.C.

[57] ABSTRACT

A connector for assembly of sieve elements consists of a fastener, a securing pin and a mounting element, The fastener is inserted in aligned apertures of the sieve element and the mounting element. A securing pin is inserted into an axial bore of the fastener to secure the connection. The fastener has an upper and a lower collar. Membranes extend longitudinally along the fastener body and are broken out when the securing pin is inserted to the axial bore of the fastener.

4 Claims, 5 Drawing Sheets 4,990,023

JOINT FOR ASSEMBLING OF SIEVE ELEMENTS

FIELD OF THE INVENTION

The present invention pertains to fastening means, and more particularly to a fastener and joining support combination for mounting sieve elements to a shaker.

BACKGROUND OF THE INVENTION

The connector of the present invention finds application in the ore manufacturing, building, and metallurgy industries.

UK Pat. No. GB 2,113,121 discloses a meshscreen having sieve elements mounted to a shaker gridiron. This patent discloses a connector consisting of fastener body, a securing plug, and a mounting element. The fastener body contains a cylindrical body having a collar on one end and a support collar on the other end. The cylindrical body is longitudinally slotted. The securing plug as well as an axial bore extending through the cylindrical body of the fixing collar are wave like in shape, having annular hollows and projections in close successions. A disadvantage of this meshscreen assembly is that it connects the sieve elements and the gridiron as one piece whereupon much time and effort is needed for detaching them due to the difficulty in pulling the fixing collar from the securing apertures of the joining supports. Another disadvantage is that the sieve elements are deformed during disassembly.

SUMMARY OF THE INVENTION

The primary object of the present invention is to provide a connecting device for quick, easy and safe assembly and disassembly of sieve elements from a gridiron of a shaker.

To accomplish this object the present invention provides a connector for assembling sieve elements on a grid comprising a mounting element having a stem with opposing gripping elements extending therefrom to grip a grid element, a crossbar extending from the stem for supporting a sieve element, the crossbar having at least one aperture for receiving a fastener, and a rounded portion connecting the stem to the crossbar to provide damping; a fastener inserted in the aperture of the crossbar having a cylindrical body, an upper collar on one side of the cylindrical body, and a bevelled lower collar on the other side of the cylindrical body, a cylindrical axial bore through the cylindrical body, at least one first slot extending longitudinally in the cylindrical body, a membrane extending across the first slot; a securing pin inserted in the axial bore of the fastener; wherein the membrane is broken and the fastener is split as a result of insertion of the securing pin.

In one embodiment of the invention the membranes located longitudinally along of the fastener body begin below the upper collar. In a second embodiment the membranes extend longitudinally along the fastener body extending to the upper edge of the upper collar. Radially extending teeth may be provided on the upper collar to prevent fastener rotation during assembly and use.

Advantages of the present invention include that in detaching sieve elements, the sieve elements do not deform or break. In addition the present invention provides for mounting of the sieve elements from either above or below.

DETAILED DESCRIPTION OF THE PREFERRED EMBODIMENTS

Figure 1:
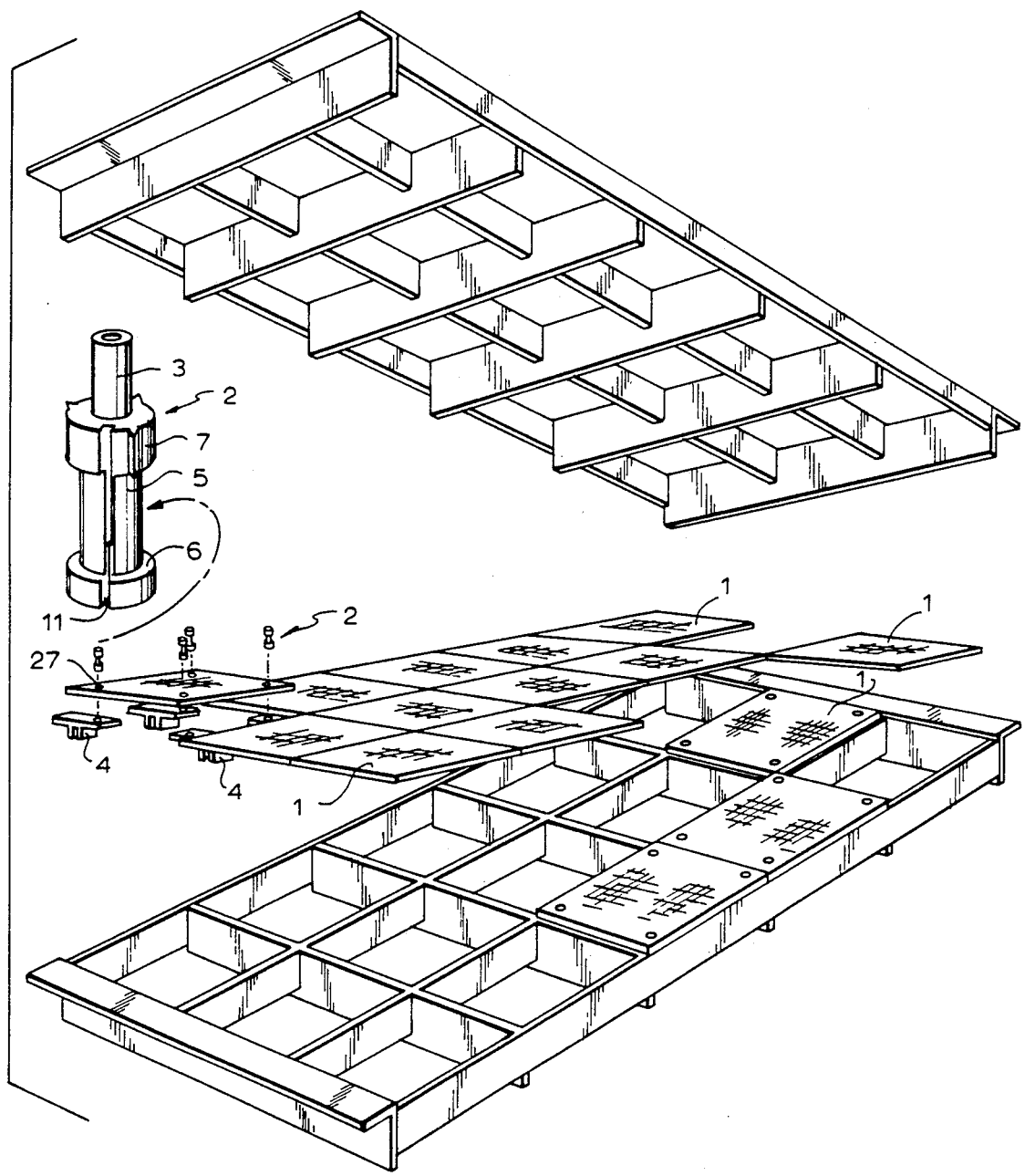
FIG. 1 is an exploded view in perspective illustrating a shaker, sieve elements, and the fastener of the present invention.

FIG. 1 is an exploded view illustrating the present invention. A shaker having sieve elements 1 mounted thereto is shown. Sieve elements 1 are mounted to the shaker by a fastener 2 having a securing pin 3 inserted therein. A mounting element 4 is also used in mounting sieve elements 1 to the shaker. Fastener 2 includes a cylindrical body 5, a lower collar 6, and an upper collar 7. References to "upper" and "lower" collars is descriptive only, since fastener 2 may be mounted from below.

Figure 2:
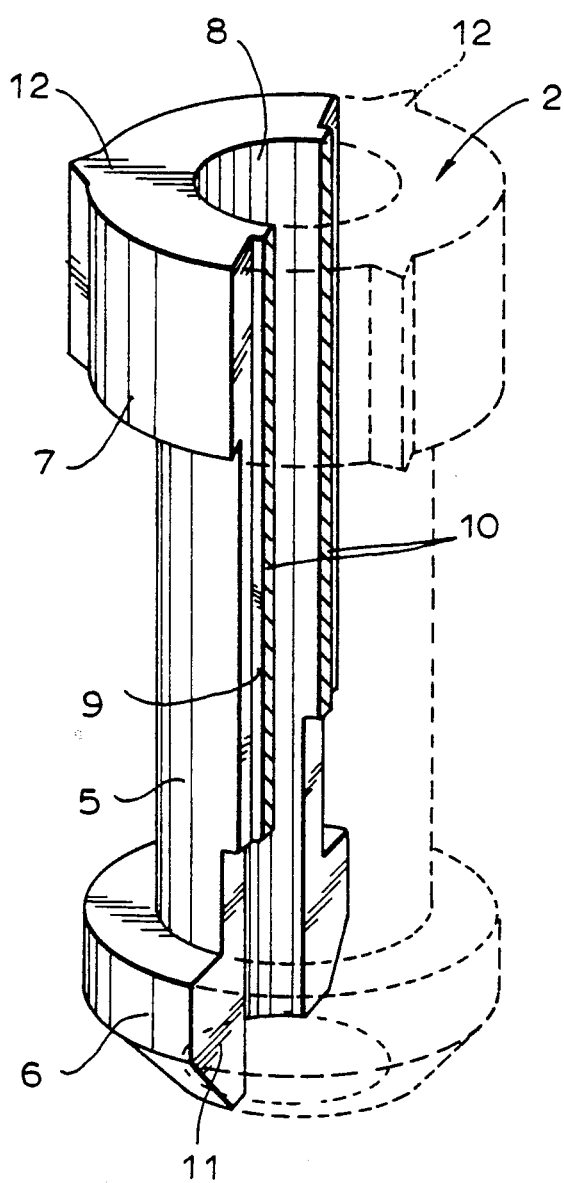
FIG. 2 is a partial perspective view of the fastener body.

Referring now to FIG. 2, fastener 2 has an axial bore 8 extending longitudinally therethrough. A membrane 10 extends longitudinally within slot 9 in fastener body 5. A lower notch 11 is also provided in fastener 2 extending from lower collar 6 up to membrane 10. The width of notch 11 is at least equal to the width of slot 9. The total width of notches 11 exceeds 3.1416 (PI) times the difference in the diameters between lower collar 6 and cylindrical body 5. On the peripheral surface of upper collar 7 teeth 12 project outwardly.

Figure 3:
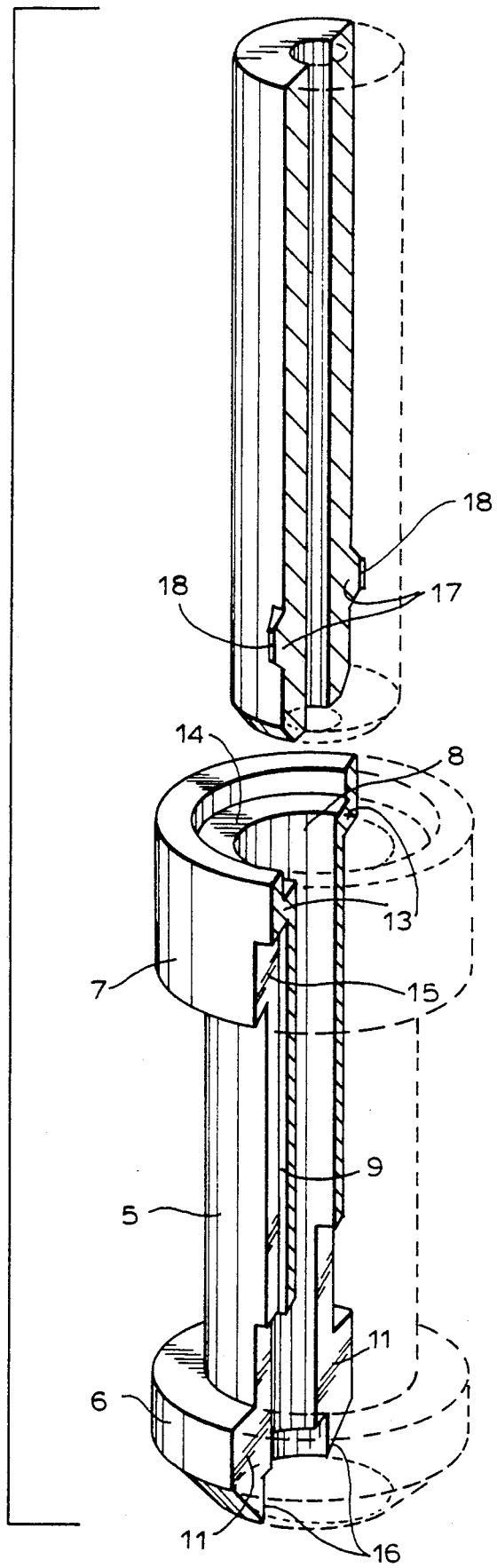
FIG. 3 is a partial perspective view of a modified embodiment of the fastener body and a securing pin.

Referring now to FIG. 3, securing pin 3 is shown spaced from fastener 2. Securing pin 3 has a cylindrical surface, the outer diameter of which is larger than the diameter of axial bore 8. In the embodiment of FIG. 3 membranes 10 coincide with the outer surface of cylindrical body 5, as compared to FIG. 2 wherein membranes 10 correspond to the inner surface of cylindrical body 5. Upper collar 7 has a solid ring 13. A ledge 14 is cut in collar 7 between axial bore 8 and the outer wall of collar 7. Radial slots 15 extend in upper collar 7 from membrane 10 to solid ring 13. A ledge 16 is also cut into lower collar 6.

In the embodiment of FIG. 3 securing pin 3 has long protrusions 17 with cutting edges 18. The number of protrusions will correspond to the number of slots 9 in fastener 2.

Figure 6:
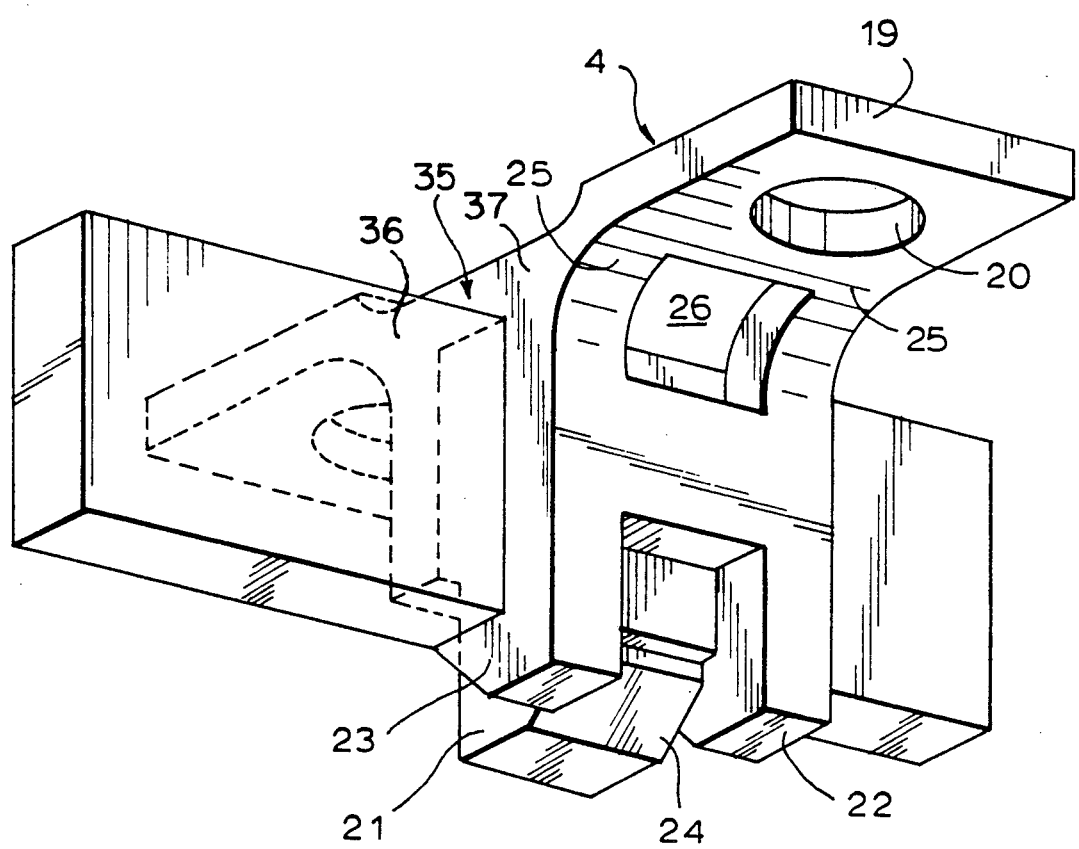
FIG. 6 is a perspective view of a mounting bar mounted to a gridiron element.

Referring now to FIG. 6, a mounting element 4 is illustrated mounted to a gridiron. Mounting element 4 includes a crossmember 19 extending horizontally from a stem portion 35 having first and second vertical sections 36 and 37 respectfully. Crossmember 19 has an aperture 20 on both sides of stem 35. In the embodiment of FIG. 6 mounting element 4 has means for clipping itself to a gridiron element. Vertical element 36 includes a single gripping element 24 and vertical element 37 includes two gripping elements 22 and 23 as shown. Gripping elements 22, 23 and 24 have bevelled forward edges to facilitate sliding them onto a gridiron element so that they snap into position. Mounting element 4 includes rounded sections 25 to provide a damping effect. Openings 26 are provided in rounded sections 25.

Figure 5:
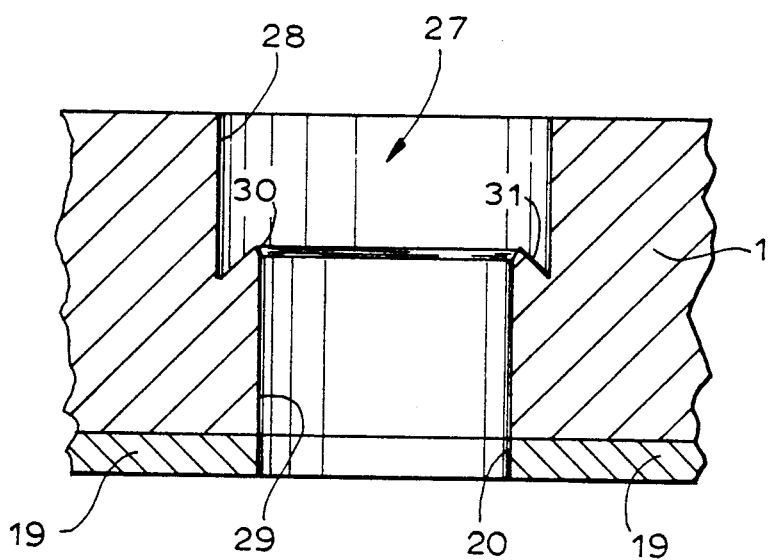
FIG. 5 is a cross-sectional view of a sieve element mounted fastener.

FIG. 5 illustrates openings 27 in sieve elements 1. Openings 27 are two staged, having an upper stage 28 and a lower stage 29. Opening 20 of crossmember 19 aligns with lower stage opening 29 when sieve element 1 is mounted on mounting element 4. Upper stage 28 is adapted to receive upper collar 7 of fastener 2. Between upper 28 and lower stage 29 is a threshold 30. An inclined surface 31 is provided between upper stage 28 and lower stage 29.

Figure 4:
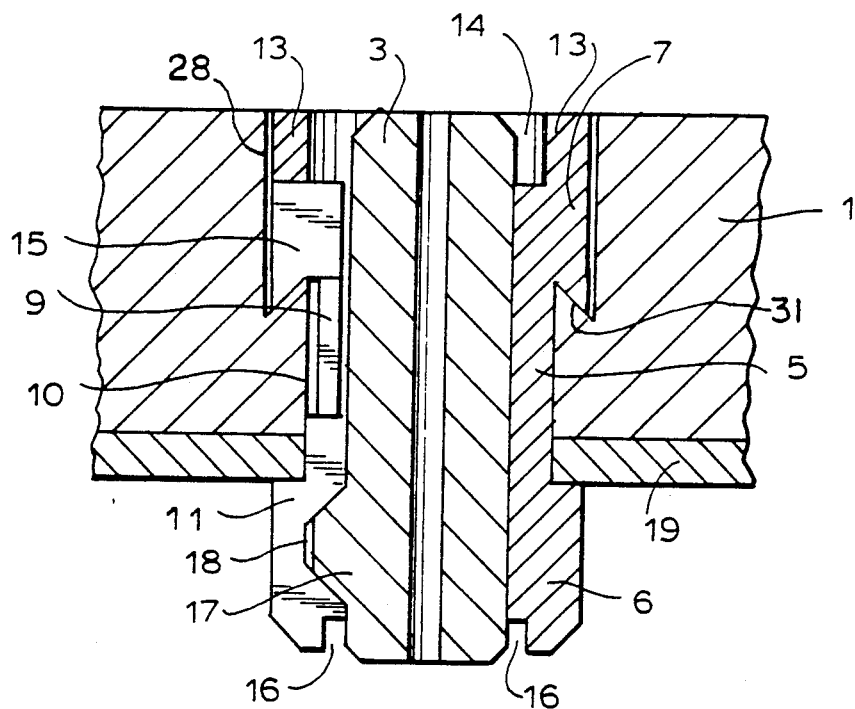
FIG. 4 is a cross-sectional view of the fastener of the present invention assembled and supporting a sieve element and connecting bar.

FIG 4 is a cross-sectional view illustrating a fastener in assembled condition supporting a sieve element 1 and a crossmember 19 of mounting element 4. Securing pin 3 is inserted into fastener 2. Crossmember 19 is supported by lower collar 6. Sieve element 1 is mounted on crossmember 19. Fastener 2 extends through opening 27 of sieve element 1 and opening 20 of crossmember 19.

ASSEMBLY OF THE INVENTION

To describe assembly and use of the present invention we refer first to FIG. 1. Mounting elements 4 are mounted to the gridiron and sieve elements 1 are mounted onto mounting elements 4. Correct positioning of mounting elements 4 is determined by aligning apertures 27 of sieve elements 1 fully with apertures 20 of mounting elements 4. Fasteners 2 are inserted into apertures 27 of sieve elements 1 so that bevelled lower collar 6 passes consecutively through upper stage 28 and lower stage 29 of sieve element 1 and through aperture 20 of crossbar 19 (see FIGS. 4 and 5). Slot 11 (FIG. 1) enables bevelled lower collar 6 to flex inwardly to permit passage through the openings 20. When fastener 2 is driven completely into its operative position bevelled lower collar 6 snaps into place supporting crossmember 19 as shown in FIG. 4. In assembled position upper collar 7 presses axially into threshold 30 of aperture 27 thereby increasing the reliability of the joint and making a tight connection between sieve element 1 and mounting element 4. Securing pin 3 is then pressed and driven into axial bore 8 of fastener 2 beginning at upper collar 7 to lower collar 6 when mounting is executed from the upper side of sieve element 1. When mounting is executed from below sieve element 1 securing pin 3 is inserted into axial bore 8 from lower collar 6 to upper collar 7.

Due to the larger diameter securing pin 3 as compared to axial bore 8 the insertion of securing pin 3 causes membranes 10 to break out so that fastener 2 is split into as many parts as there are slots 9. Teeth 12 of upper collar 7 dig into the surface of upper stage 28 of aperture 27. In the event that only one of membranes 10 is broken out as a result of insertion of securing pin 3, teeth 12 do not permit fastener 2 to rotate about its axis.

Assembly of sieve elements 1 from below will now be described. Sieve elements 1 are placed on crossmember 19 of mounting element 4 and the apertures 20 and 27 are aligned as noted above. Fastener 2 is then inserted through apertures 20 and 27 in such a manner that lower collar 6 flexes inwardly and snaps out when in assembled position. Lower collar 6 passes consecutively through aperture 20 of cross member 19, then lower stage 29 of aperture 27. When fastener 27 is driven into its assembled position upper collar 7 touches crossmember 19 from below in the area of aperture 20. Securing pin 3 is then pressed and driven into axial bore 8 from below, directed upwardly. Bevelled lower collar 6 presses tightly radially against threshold 30. In this manner the objective of the present invention is obtained by providing a solid and reliable connection between sieve elements 1 and mounting elements 4 which are connected to the gridiron of a shaker.

Removal of a sieve element from the gridiron will now be described. Securing pin 3 is hammered to push it out of axial bore 8. It may be hammered from either side whichever is most convenient. The split fastener 2, which is divided into parts equal in number to slots 9, collapses sufficiently to liberate sieve element 1 and mounting element 4. Fastener 2 collapses sufficiently to pass through aperture 27 of sieve element 1 and aperture 20 of mounting element 4. Consequently fastener 2 releases worn sieve elements 1 from the gridiron without difficulty, and without pulling which causes deformation.

Although the invention is described and illustrated with reference to a plurality of embodiments thereof it is to be expressly understood that it is in no way limited to the disclosure of such embodiments but is capable of numerous modifications within the scope the appended claims.

We claim:

1. A connector for assembling sieve elements on a grid comprising:
   a mounting element having a stem with opposing gripping elements extending therefrom to grip a grid element, a crossbar extending from the stem for supporting a sieve element, the crossbar having at least one aperture for receiving a fastener, and a rounded portion connecting the stem to the crossbar to provide damping;
   a fastener inserted in the aperture of the crossbar having a cylindrical body, an upper collar on one end of the cylindrical body, and a bevelled lower collar on the other end of the cylindrical body, a cylindrical axial bore through the cylindrical body, at least one first slot extending longitudinally in the cylindrical body, and a membrane extending across the first slot;
   a securing pin inserted in the axial bore of the fastener; wherein the membrane is broken and the fastener is split as a result of insertion of the securing pin.

2. The device of claim 1 wherein an inner surface of the membrane coincides with the inner surface of the cylindrical body, and wherein the outer surface of the upper collar has teeth extending radially therefrom.

3. The device of claim 1 wherein an outer surface of the membrane coincides with the outer surface of the cylindrical body, the upper collar has a solid circumferential ring, and wherein the securing pin has at least one protrusion extending radially therefrom having a cutting edge thereon.

4. The device according to claim 2 further comprising a sieve element mounted on the mounting element and having a two-stage opening therein, the fastener being mounted within the two-stage opening.

* * * * *